United States Patent
Sano

(10) Patent No.: US 6,882,681 B2
(45) Date of Patent: Apr. 19, 2005

(54) SPREAD SPECTRUM RECEIVING APPARATUS

(75) Inventor: Hiroyasu Sano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 599 days.

(21) Appl. No.: 10/018,999

(22) PCT Filed: Apr. 19, 2001

(86) PCT No.: PCT/JP01/03365
§ 371 (c)(1),
(2), (4) Date: Dec. 26, 2001

(87) PCT Pub. No.: WO01/82501

PCT Pub. Date: Nov. 1, 2001

(65) Prior Publication Data
US 2002/0181561 A1 Dec. 5, 2002

(30) Foreign Application Priority Data

Apr. 26, 2000 (JP) ........................ 2000-126467

(51) Int. Cl.$^7$ .............................................. H04B 1/707
(52) U.S. Cl. ........................ 375/148; 375/144; 370/342
(58) Field of Search ................................. 375/147, 148, 375/150, 144, 346, 349; 370/335, 342

(56) References Cited

U.S. PATENT DOCUMENTS 6,208,683 B1 * 3/2001 Mizuguchi et al. ......... 375/140

FOREIGN PATENT DOCUMENTS

| EP | 0 849 888 | 6/1998 |
| EP | 0 876 002 | 11/1998 |
| EP | 0 896 441 | 2/1999 |
| EP | 0 949 769 | 10/1999 |
| JP | 10-327126 | 12/1998 |
| JP | 11-177474 | 7/1999 |
| JP | 11-205286 | 7/1999 |
| JP | 11-266180 | 9/1999 |
| JP | 11-298371 | 10/1999 |

OTHER PUBLICATIONS

N. Ishii, et al., Vehicular Technology Conference, pp. 1855–1859, XP–010353279. "Multiuser Space–Time Interference Cancellation System for CDMA Mobile Communications", Sep. 19, 1999.
"Experimental Evaluation on Coherent Adaptive Array Antenna Diversity for DS–CDMA Reverse Link" The Institute of Electronics, Information and Communication Engineers. pp. 33–38 Oct. 1998.
"Laboratory Experiments on Coherent Rake Receiver in Broadband DS–CDMA Mobile Radio." The Institute of Electronics, Information and Communication Engineers. pp. 57–62 Oct. 1999.

* cited by examiner

Primary Examiner—Temesghen Ghebretinsae
(74) Attorney, Agent, or Firm—Oblon, Spivak, McClelland, Maier & Neustadt, P.C.

(57) ABSTRACT

A path detector (140) detects a plurality of multi-path waves that have satisfied a predetermined standard from reverse spread signals, a plurality of adders (161) form beams on the basis of a path, a plurality of transfer path estimating sections (170) and complex conjugate calculators (163) calculate a transfer path estimation value, and based upon the result of the estimation, carry out a weighting process in accordance with the signal amplitude and a removing process of the phase variations. Moreover, a plurality of interference amount estimating sections (171) extract the amount of interference, a plurality of normalizing sections (172) normalize the signals that have been subjected to the phase variation removing process based upon the amount of interference, an adder (185) combines all the signals that have been normalized, and a data determining section (190) determines the signal that have been combined.

5 Claims, 8 Drawing Sheets

SLOT CONSTRUCTION

SPREAD SPECTRUM RECEIVING APPARATUS

TECHNICAL FIELD

The present invention relates to a spectrum spread receiver that uses a Code Division Multiple Access (CDMA) System which adopts a spectrum spread modulation system. More particularly, this invention relates to a spectrum spread receiver that carries out communications by using a transfer path in which a frequency selective fading is generated.

BACKGROUND ART

A conventional spectrum spread receiver will be described here. Conventional spectrum spread receivers that use the CDMA system which adopts the spectrum spread modulation system have been disclosed in, for example, "Experimental Evaluation on Coherent Adaptive Array Antenna Diversity for DS-CDMA Reverse Link, The Institute of Electronics, Information and Communication Engineers, Technical Report of IEICE, RCS98-94 p.33–38, September, 1998", and "Laboratory Experiments on Coherent Rake Receiver in Broadband DS-CDMA Mobile Radio, The Institute of Electronics, Information and Communication Engineers, Technical Report of IEICE, RCS99-129 p.57–62, October, 1999".

A construction and an operation of the conventional spectrum spread receiver(s) disclosed in the above-mentioned references will explained now. FIG. 6 shows the construction of the conventional spectrum spread receiver. In FIG. 6, reference numerals 500, 501, . . . , 502 are antennas the number of which is represented by N (a natural number), 510, 511, . . . , 512 are band-path filters (BPFs), 520, 521, . . . , 522 are reverse spread sections, 530, 531, . . . , 532 are beam forming sections for individually forming beams from L (a natural number) paths generated based upon a signal after the reverse spread that has been subjected to an influence from a multi-path waveform, 540 is a path detector, 550, 551, . . . , 552 are complex multipliers, 553 is a delay unit, 560 is a weight controlling section, 561 is an adder, 562 is a complex multiplier, 563 is a complex conjugate calculator, 564 is a subtracter, 565 is a complex multiplier, 570 is a transfer path estimating section for estimating the transfer path with respect to each of individual paths, 580, 581, . . . , 582, . . . , 583 and 584 are delay units, 585 is an adder, and 590 is a data determining section.

An operation of the conventional spectrum spread receiver will now be explained. First, signals received from a mobile station by the N antennas 500, 501, . . . , 502 are filtered by the BPFs 510, 511, . . . , 512, and subjected to desired band-width limitations. The signals after having been subjected to the band-width limitations are input into the reverse spread sections 520, 521, . . . , 522 at which they are subjected to reverse spreads by the same sequence as the spread code sequence (corresponding to the PN sequence) that have been used on the transmission side.

The path detector 540 selects L paths from a specific one of the signals that have been subjected to the reverse spread signal that has been influenced by the multi-path wave. A detailed explanation will be given of the operation of the path detector 540. FIG. 7 shows the construction of the path detector 540. In FIG. 7, reference numeral 600 is a transfer path estimating section, 601 is an average power-value calculator, 602 is a threshold value calculator, 603 is a judgment section and 604 is a path selector.

In this path detector 540, first, the transfer path estimating section 600 adds all the symbols within one slot in the same phase based upon a pilot symbol (known signal) placed at a slot unit, and outputs a spontaneous transfer-path estimating value as a result. Subsequently, the average power value calculator 601 carries out an averaging operation of power over several slots by using the received transfer path estimating value, thereby calculating the average power delay profile as the result of the operation.

In the threshold value calculator 602, among the received average power delay profiles, the path having the smallest power is regarded as noise or interference power, and the power value that is greater than the power by ΔdB is output as a threshold value used for the path selection. Then, the judgment section 603 compares the average power delay profile and the threshold value, and all the paths having average power values greater than the threshold value are set as the multi-paths corresponding to desired signals. Further, it outputs the time-sequential positional information of these paths and the power values of these paths.

In the path selector 604, since each beam forming section carries out a signal processing only on L paths preliminarily determined due to the limitations of H/W and S/W, the L paths are selected in the descending order from the greatest average power value. Thus, the time-sequential position corresponding to each path is output as the path position information. FIG. 8 shows the processes in the threshold value calculator 602, the judgment section 603 and the path selector 604.

After the output of the path positional information from the path detector 540, the beam forming sections 530, 531, . . . , 532 form beams by signal processes based upon an applicable algorithm. The beam forming section 530 is used for carrying out signal processing on the path having the greatest signal power, and the beam forming sections 531, . . . , 532 are used for carrying out signal processing on the paths having the second greatest signal power to the L-th greatest signal power. The following description will discuss the operation of the beam forming section 530 in detail.

As described above, the reverse spread signal from the reverse spread section 520 is separated by the path detector 540 into each path unit, and input into the beam forming section 530. Therefore, in each beam forming section, the beam is formed on a path unit basis that has been detected.

First, in the weight controlling section 560, the calculation of weight is carried out based upon an adaptive algorithm such as LMS (Least Mean Square), and in each of the complex multipliers 550, 551, . . . , 552, the signal received by each antenna is multiplied by a complex weight for forming a beam on the basis of a path. Then, the adder 561 combines the respective receiving signals that have been multiplied by the complex weights, and outputs the results of the combined as an antenna combined signal having directivity.

Next, the transfer path estimating section 570 estimates the transfer path. More specifically, for example, by using pilot symbols of a known sequence that are provided for the respective slots, a transfer path estimation value (complex value) with respect to the first path is calculated. FIG. 9 shows the slot construction.

The complex conjugate calculator 563 calculates the complex conjugate value of the transfer path estimation value calculated in the transfer path estimating section 570. Then, the complex conjugate value is input into the complex multiplier 562 in which it is multiplied by the antenna combined signal, thus, a weighting process is carried out in proportion to the signal amplitude, and a signal from which a phase variation has been removed is output.

After the beam forming sections 530, 531, . . . 532 have formed the first (the path having the greatest signal power) to the L-th beams (the path having the L-th greatest signal power), the delay units 580, 581, . . . , 582 respectively add amounts of delay $D_1, D_2, \ldots, D_L$ thereto so that all the paths from the first path to the L-th path have the same timing.

The adder 585 adds the signals which have been allowed to have the same phase on the basis of a path. The data decision section 590 performs a hard determination on the data. The result of the hard determination is output as demodulation data of the receiver. Here, since the results of the hard determination are used as reference signals for forming the beams of the respective paths, the delay units 583 to 584 respectively carry out delay adjustments so that, for example, amounts of delay, $D_L-D_1, D_L-D_2, \ldots, 0$ (where the L-th path is not subjected to a delay) are added thereto.

An explanation will be given on how the weights to be added to the respective receiving signals is determined by, for example, the beam forming section 530. It will be assumed here that, an already known algorithm is used for forming the beams.

For example, the output of the delay unit 584 is multiplied by the transfer path estimation value in the complex multiplier 565, to form a reference signal. Thereafter, in the subtracter 564, the antenna combined signal is subtracted from the reference signal to generate an error signal $e_1(k)$ to be adaptive to the first path. Then, the weight controlling section 560 updates/determines the weight in accordance with equation (1) that indicates the normalization LMS.

$$W_1(k+1) = W_1(k) + \mu \frac{X_1(k-\tau)}{\|X_1(k-\tau)\|^2} e_1(k) \quad (1)$$

Here, the denominator of the second term on the right side of equation (1) represents a norm, k represents the sampling time ($t=kT_S$: $T_S$ is a sampling cycle), $X_1(k)$ is a vector expression ($X_1(k)=[x_1(1, k), x_1(2, k), \ldots, x_1(N, k)]^T$) of the first path of each reverse spread signal, and $W_1(k)$ is a vector expression of each weight with respect to the first path ($w_1(1,k)=w_1(1,k), w_1(2,k), \ldots, w_1(N,k)^T$). Moreover, the initial value $w_1(0)$ of $W_1(k)=[1, 0, \ldots, 0]^T$, $\mu$ represents the step size, and $\tau$ represents a delay time (amount of delay).

In this manner, in the conventional spectrum spread receiver, with respect to L paths detected from the receiving signals received from a plurality of antennas, beams are individually formed (by using adaptive algorithms), that is, the SIR (signal to interference power ratio) with respect to a desired signal is improved while directing a null set to the interference signal by carrying out a weighting combining (Rake combining) in accordance with the transfer path estimation value. Moreover, the conventional spectrum spread receiver is allowed to have an optimal channel capacity in the case when the positional distribution of mobile stations within a cell to which a base station can provide services is uniform and in the case when the beam interference power of beams formed on the basis of a path is the same.

However, in the above-mentioned conventional spectrum spread receiver, in the case when the interference wave power of beams formed on the basis of a path is not regarded as the same due to the fact that the positions of mobile stations are instantaneously biased or the fact that mobile stations having different transmission signal powers exist because of different transmission speeds, the SIR is not optimized, failing to obtain a superior bit error characteristic; consequently, the resulting problem is that it is not possible to obtain an optimal channel capacity.

Moreover, in the conventional spectrum spread receiver, another problem is that, in the case when a mobile station that is a subject for communication is shifted and the shifting velocity is a high speed, it is difficult for the base station to direct beams to the mobile station with high precision.

Moreover, in the initial state for forming beams by using an adaptive array antenna in the conventional spectrum spread receiver, since it is difficult to tell the arrival direction of multi-path waves from a mobile station to the base station, and since it is not possible to form a beam having a sharp directivity, the selection of the path is carried out by utilizing a single antenna as described above. However, the resulting problem is that, in the case of using the single antenna, it is not possible to detect paths with high precision, in a transfer path under a great effect of interference.

Moreover, in the conventional spectrum spread receiver, as described above, in the case when a single antenna is used, the weight is set to each receiving signal. In this case, however, a long period of time is required until the beam has been formed based upon the adaptive algorithm, and on the transmission side of the mobile station, much transmission signal power is required until the beam formation has been finished, in order to satisfy the predetermined quality on the base station. Consequently, an instantaneous increase occurs in the interference power, causing a failure to obtain an optimal channel capacity.

It is an object of the present invention to provide a spectrum spread receiver which can achieve a desirable bit error rate characteristic, even in the case when the interference powers of the beams formed on the basis of a path are not considered to be the same.

It is an another object of the present invention to provide a spectrum spread receiver which, even in the case when a mobile station that is an object of communication is shifted, and when the shifting velocity is high, allows the base station to direct a beam to the mobile station with high precision.

It is a still another object of the present invention to provide a spectrum spread receiver which, even in the case when a path is selected by using a single antenna, can carry out the path detection with high precision, and also can greatly shorten the time required for forming beams based upon an adaptive algorithm.

DISCLOSURE OF THE INVENTION

The spectrum spread receiver according to one aspect of the present invention, which carries out a reverse spreading process on a signal received by a single antenna or a plurality of antennas, and also carries out a data demodulation process based upon the reverse spread signal, comprises: a path detection unit (corresponding to a path detector 140 which is described in the embodiments that will be described later) which detects a plurality of multi-path waves from the reverse spread signal, which have satisfied a predetermined standard and for outputting time-sequential positional information of the paths; a plurality of beam forming units (corresponding to complex multipliers 150 to 152 and an adder 161) which form beams by using an adaptive algorithm based upon the time-sequential positional information that is received on the basis of the path; a plurality of transfer path estimation units (corresponding to a transfer path estimating section 170 and a complex conjugate calculator 163) which calculate a transfer path estimation value based upon a receiving signal obtained on the basis of a beam, and carries out a weighting process in accordance with the signal amplitude and a removing process on the phase variation, based upon the results of the estimation; an interference amount extraction unit (corresponding to an interference amount estimating section 171) which extracts an amount of interference based upon the received signal obtained on the basis of a beam; a plurality of normalizing units (corresponding to a normalizing section 172) which normalize the signals that have been subjected to the phase variation removing process based upon the amount of interference; a combining unit (corresponding to delay units 180, 181, . . . , 182 and an adder 185) which combines all the signals that have been normalized; and a determining unit (corresponding to a data determining section 190) which determines the signal after the combining by the combining unit.

In the above-mentioned spectrum spread receiver, the interference amount extraction unit calculates the amount of interference based upon a known sequence added to the transmission signal.

In the above-mentioned spectrum spread receiver, the path detection unit comprises: a plurality of beam generating units (corresponding to a plurality of beams generating section 141) which generate a plurality of beams required for covering areas that are the service areas; a path power normalizing unit (corresponding to path detectors 200, 210 and 220 on the basis of a beam) which detects all the paths having power values not less than a predetermined threshold value on the basis of a beam, and for normalizing the power value that has been detected based upon the interference power calculated for each of the beams; and a path selection unit (corresponding to a pass selector 330) which selects a predetermined number of paths among the paths that have been detected in a descending order from the biggest power value.

In the above-mentioned spectrum spread receiver, with respect to the initial value of the weight required for forming a beam using the adaptive algorithm, the beam forming unit uses the weight obtained at the time of beam formation by the plurality of beam generating units.

In the above-mentioned spectrum spread receiver, the adaptive algorithm is allowed to calculate an error signal by subtracting the received signal from the reference signal generated from the results of the determination, and also to generate a new error signal by carrying out an integral process by using a weighting coefficient on the error signal.

BEST MODE FOR CARRYING OUT THE INVENTION

Embodiments of a spectrum spread receiver in accordance with the present invention will be explained while referring to the accompanying drawings. The present invention is not intended to be limited by these embodiments.

First Embodiment

Figure 1:
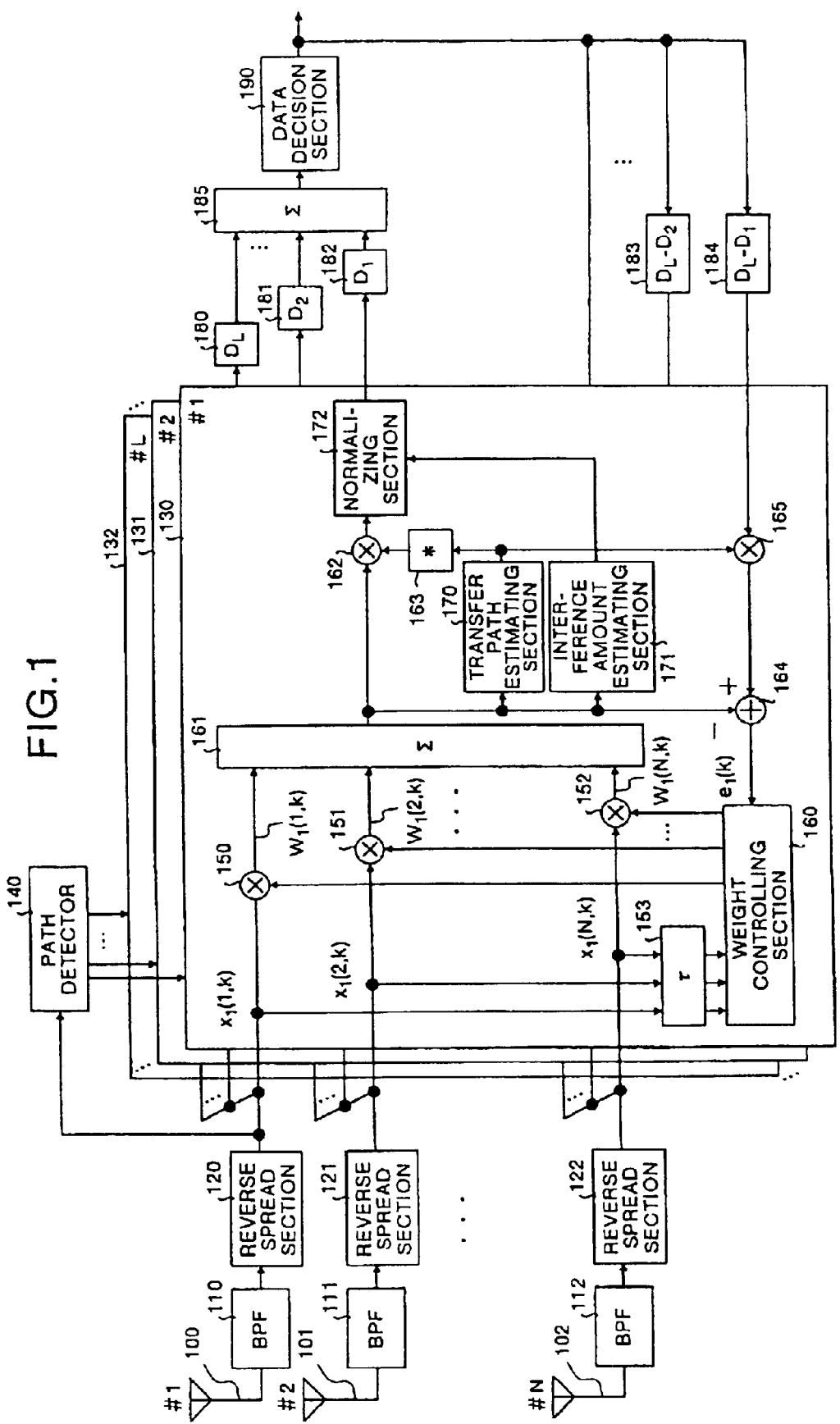
FIG. 1 shows the construction of a spectrum spread receiver of a first embodiment of the present invention.

The first embodiment is related to a spectrum spread receiver in which an adaptive array antenna is used. FIG. 1 shows the construction of a spectrum spread receiver in accordance with the first embodiment. In FIG. 1, reference numerals 100, 101, . . . , 102 are antennas the number of which is represented by N (a natural number); 110, 111, . . . , 112 are band-pass filters (BPFs); 120, 121, . . . , 122 are reverse spread sections; 130, 131, . . . , 132 are beam forming sections for individually forming beams based upon L (a natural number) paths generated by signals that have been subjected to the reverse spread under an influence of a multi-path wave; 140 is a path detector; 150, 151, . . . , 152 are complex multipliers; 153 is a delay unit; 160 is a weight controlling section; 161 is an adder; 162 is a complex multiplier; 163 is a complex conjugate calculator; 164 is a substracter; 165 is a complex multiplier; 170 is a transfer path estimating section for estimating a transfer path with respect to each of the paths; 171 is an interference amount estimating section for estimating an interference amount with respect to each of the paths; 172 is a normalizing section for normalizing the output of the complex multiplier 162; 180, 181, . . . , 182, . . . , 183, 184 are delay units; 185 is an adder; and 190 is a data decision section.

An operation of the spectrum spread receiver according to the first embodiment will now be explained. First, signals from mobile stations, received through N-number of antennas 100 to 102 are respectively wave-filtered by BPFs 110, 111, . . . , 112 and subjected to desired band-width limitations. Then, the signals that have been subjected to the band-width limitations are input into reverse spread sections 120, 121, . . . , 122; and in this case, the reverse spreading operation is carried out by using the same sequence as the spread code sequence (corresponding to the PN-sequence) used in the transmission side.

Figure 7:
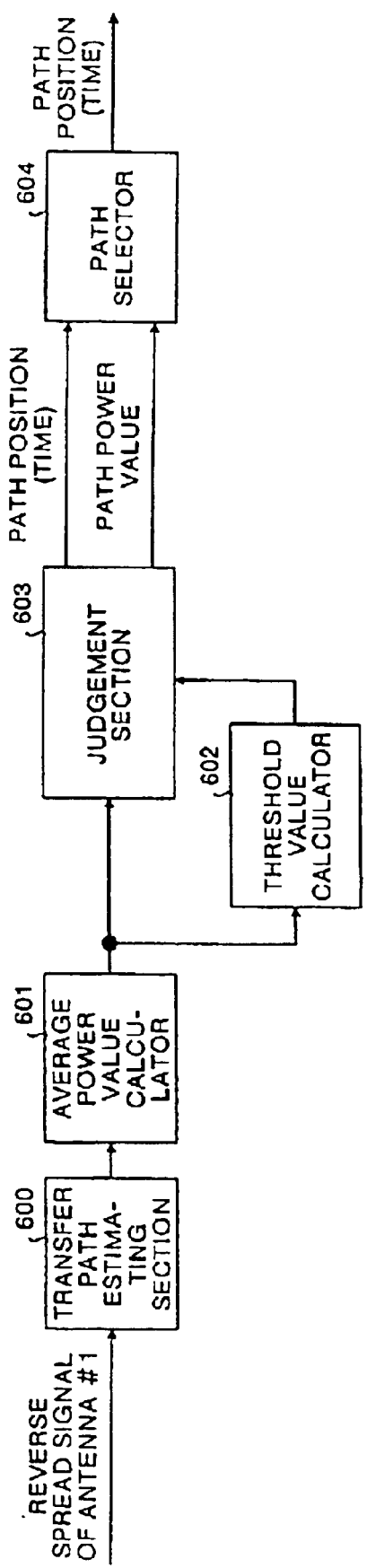
FIG. 7 shows the construction of a path detector.
Figure 8:
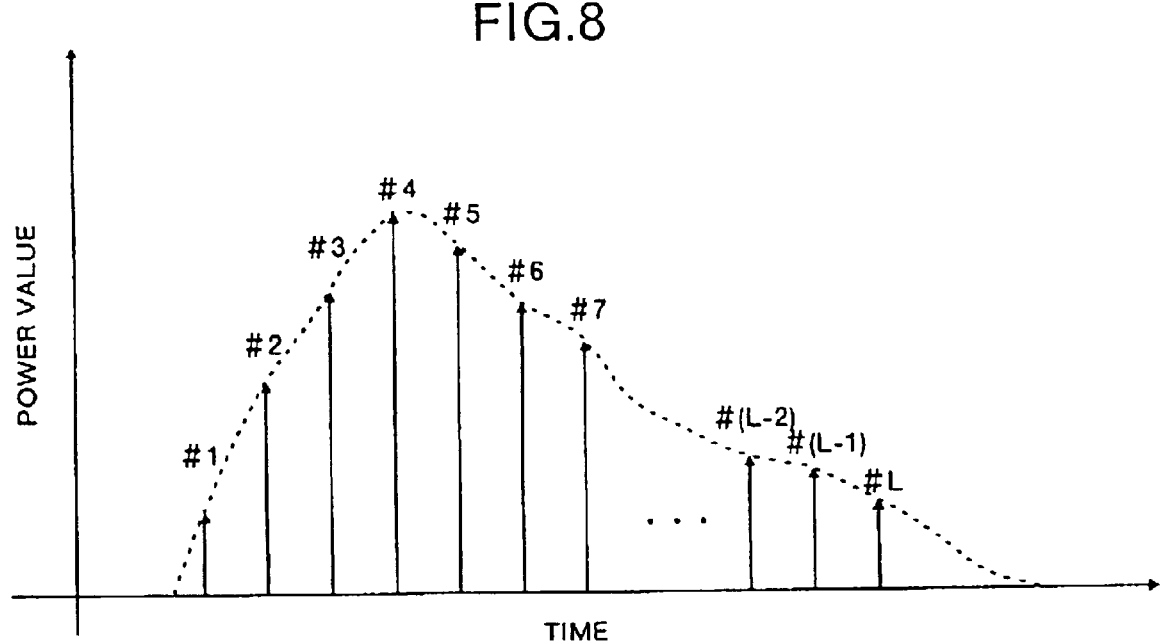
FIG. 8 shows processes in a threshold-value calculator, a judgment section and a path selector.

In the mobile communication, since the electric waves are reflected, diffracted and scattered by buildings and terrines on the periphery thereof, the arrival of multi-pass waves that have passed through a plurality of transfer paths causes interference, and results in a frequency selective fading which allows the amplitude and phase of the receiving wave to vary at random. Therefore, the path detector 140 selects L paths from one reverse spread signal that has been subjected to the influence of the multi-path wave, in the same manner as the conventional technique (see FIG. 7). More specifically, in the respective beam forming sections which will be described later, only L paths, which have been preliminarily defined based upon the limitations in H/W and S/W, are subjected to signal processing. Therefore, for example, L paths are selected from all the paths in the descending order from the one having the biggest average power value, and time-sequential positions corresponding to the respective paths are output as path position information.

After the output of the path position information by the path detector 140, the beam forming sections 130, 131, . . . , 132 form beams by the signal processing in the adaptive algorithm. he beam forming section 130 carries out the signal processing on the path having the greatest signal power in the same manner as the conventional device, and with respect to beam forming sections 131, . . . , 132 also, they carry out the signal processing on the paths from the second greatest to the L-th greatest in the signal power, in the same manner as the conventional arrangement.

A detailed explanation will be given of the operation of the beam forming section 130. The reverse spread signal from the above-mentioned reverse spread section 120 is separated by the path detector 140 on the basis of a path, and input into the beam forming section 130. Therefore, in each of the beam forming sections, a beam is formed on the basis of a detected path.

First, in the weight controlling section 160, the calculation of weight is carried out based upon an adaptive algorithm such as LMS (Least Mean Square), and in each of the complex multipliers 150 to 152, the signal received by each antenna is multiplied by a complex weight for forming a beam on the basis of a path. Then, the adder 161 combines the respective receiving signals that have been multiplied by the complex weights, and outputs the results of the combining as an antenna combined signal having directivity.

Figure 9:
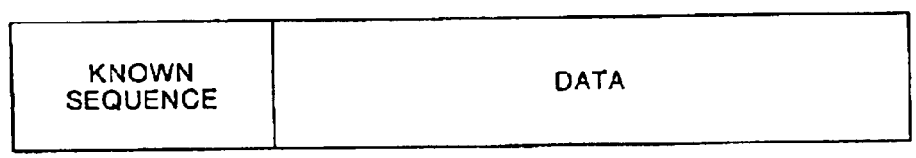
FIG. 9 shows the construction of slots.

Next, the transfer path estimating section 170 estimates the transfer path. More specifically, by using pilot symbols (see FIG. 9) of a known sequence that are provided for the respective slots, a transfer path estimation value (complex value) with respect to the first path is calculated. Thereafter, in the complex conjugate calculator 163, a complex conjugate value of the transfer path estimation value calculated by the transfer path estimating section 170 is calculated. Then, this complex conjugate value is input into the complex multiplier 162 at which it is multiplied by the antenna combined signal; thus, a weighting process is carried out in proportion to the signal amplitude, and a signal from which a phase variation has been removed is output.

Here, the interference amount estimating section 171 calculates the interference amount from the output $y_1(k_s, j)$ of the adder 161 that is an antenna combined signal. Here, $k_s$ indicates the order of the slots, and j represents the order of pilot symbols in the $k_s$-th numbered slot.

First, the interference amount estimating section 171 adds the pilot symbols $P_s(k_s, j)$ within the $k_s$-th slot corresponding to all the symbols in the same phase (here, $|P_s(k_s, j)|=1$), thereby calculating the transfer path estimation value $\eta_1(k_s)$. Here, $\eta_1(k_s)$ is a complex number.

Next, as indicated by equation (2), the interference estimating section 171 calculates the interference amount $\sigma_1^2(k_s)$ of the $k_s$-th slot, by using the transfer path estimation value $\eta_1(k_s)$ and the output $y_1(k_s, j)$ of the adder 161.

$$\sigma_1^2(k_S) = \frac{1}{P}\sum_{j=1}^{P} |y_1(k_S, j) \cdot P_S^*(k_S, j) - \eta_1(k_S)|^2 \qquad (2)$$

Here, $P_s^*(k_s, j)$ is a complex conjugate value of $P_s(k_s, j)$, and P represents the number of pilot symbols within one slot.

Finally, the interference amount estimating section 171 carries out an averaging process over a plurality of slots in accordance with equation (3), with respect to the interference amount $\sigma_1^2(k_s)$ of the resulting $k_s$-th slot; thus, the interference amount estimation value $I_1(k_s)$ of the k-th slot in the beam formed from the first path.

$$I_1(k_S) = \frac{1}{S}\sum_{i=0}^{S-1} \sigma_1^2(k_S - S) \qquad (3)$$

Here, S represents the number of slots used in the averaging process.

Thereafter, the normalizing section 172 divides the signal that has been subjected to the weighting/phase variation removing process, that is, the output of the complex multiplier 162, by the interference amount estimation value $I_1(k_s)$, that is, the output of the interference amount estimating section 171, and outputs a normalized signal on the basis of a beam.

After having formed beams from the first (the path having the greatest signal power) to the L-th (the path having the L-th greatest signal power) beams by the beam forming sections 130, 131, . . . , 132, the delay units 180, 181, . . . , 182 respectively add amounts of delay $D_1, D_2, \ldots, D_L$ thereto so that all the paths from the first path to the L-th path have the same timing.

In the adder 185, signals which have been allowed to have the same phase on the basis of a path are combined, and in the data decision section 190, a hard determining process is carried out on the data; thus, the result of the hard determination is output as demodulation data of the receiver. Here, since the results of the hard determination are used as reference signals for forming the beams of the respective paths, the delay units 183 to 184 respectively carry out delay adjustments so that, for example, amounts of delay, $D_L-D_1$, $D_L-D_2, \ldots, 0$ (where the L-th path is not subjected to a delay) are added thereto.

Then, the beam forming section 130 receives the hard determination data to which the above-mentioned amounts of delay have been added, thereby determining the weights to be added to the respective receiving signals. Here, known adaptive algorithms are used for forming the beams.

For example, the output of the delay unit 184 is multiplied by the transfer path estimation value by the complex multiplier 165 to form a reference signal. Thereafter, the subtracter 164 subtracts the antenna combined signal from the reference signal, thereby generating an error signal $e_1(k)$ for the first path. Then, the weight controlling section 160 updates/determines weights in accordance with the above-mentioned equation (1) representing the normalization LMS.

In this manner, in the first embodiment, even in the case when the interference wave power of beams formed on the basis of a path is not regarded as the same due to the fact that the positions of mobile stations are instantaneously biased or the fact that mobile stations having different transmission signal powers exist because of different transmission speeds, the signal after the weighting process/the phase variation removing process, which is the output from the complex multiplier 162, is combined after having been subjected to the weighting process in accordance with the interference amount, that is, after having been subjected to the normalization. Therefore, the SIR can be optimized, making it possible to obtain a superior bit error characteristic; consequently, it is possible to obtain an optimal channel capacity.

In the first embodiment, the LMS is used for determining weights so as to determine beams. However, the adaptive algorithm is not intended to be limited by this, and for example, a known algorithm such as RLS may be used.

Second Embodiment

In the same manner as the first embodiment, the second embodiment carries out calculations of weights based upon an adaptive algorithm such as LMS; however, it is also characterized by carrying out an integral process in which a weighting process is applied to the error signal $e_1(k)$. Here, those parts that are the same as those shown in FIG. 1 of the first embodiment are indicated by the same reference numerals, and the description thereof is omitted. Therefore, the following description will discuss the operation of the weight controlling section 160.

First, the weight controlling section 160 receives the error signal $e_1(k)$ from the subtracter, and carries out an integral process on the error signal $e_1(k)$ by using a weighting coefficient $\lambda$.

$$E_1(k+1)=E_1(k)+\lambda \cdot e_1(k) \qquad (4)$$

λ is a weighting coefficient (0<λ<1), and $E_1(k)$ is a complex number value. The complex number value $E1(k)$ is $E_1(0)=0$.

Then, the weight controlling section 160 updates/determines the weight in accordance with equation (5) that indicates the normalization LMS.

$$W_1(k+1) = W_1(k) + \mu \frac{X_1(k-\tau)}{\|X_1(k-\tau)\|^2} \cdot (e_1(k) + E_1(k)) \quad (5)$$

The denominator of the second term on the right side of equation (5) represents a norm, k represents the sampling time ($t=kT_S$: $T_S$ is a sampling cycle), $X_1(k)$ is a vector expression ($X_1(k)=[x_1(1,k), x_1(2,k), \ldots, x_1(N,k)]^T$) of the first path of each reverse spread signal, and $W_1(k)$ is a vector expression of each weight for the first path ($w_1(k)=[w_1(1,k), w_1(2,k), \ldots, w_1(N,k)]^T$) with respect to the first path. Moreover, the initial value of $W_1(k)$ is represented by $w_1(0)=[1, 0, \ldots, 0]^T$, $\mu$ represents the step size, and $\tau$ represents a delay time (amount of delay)

In this manner, in the second embodiment, it is possible to obtain the same effects as the first embodiment, and also to carry out an integral process on the error signal $e_1(k)$ by using weighting coefficient λ, consequently to emphasize its characteristics. Therefore, even in the case when the mobile station that is a communication target is shifted, and when the shifting speed is high, it is possible for the base station to direct a beam to the mobile station with high precision.

Third Embodiment

Figure 2:
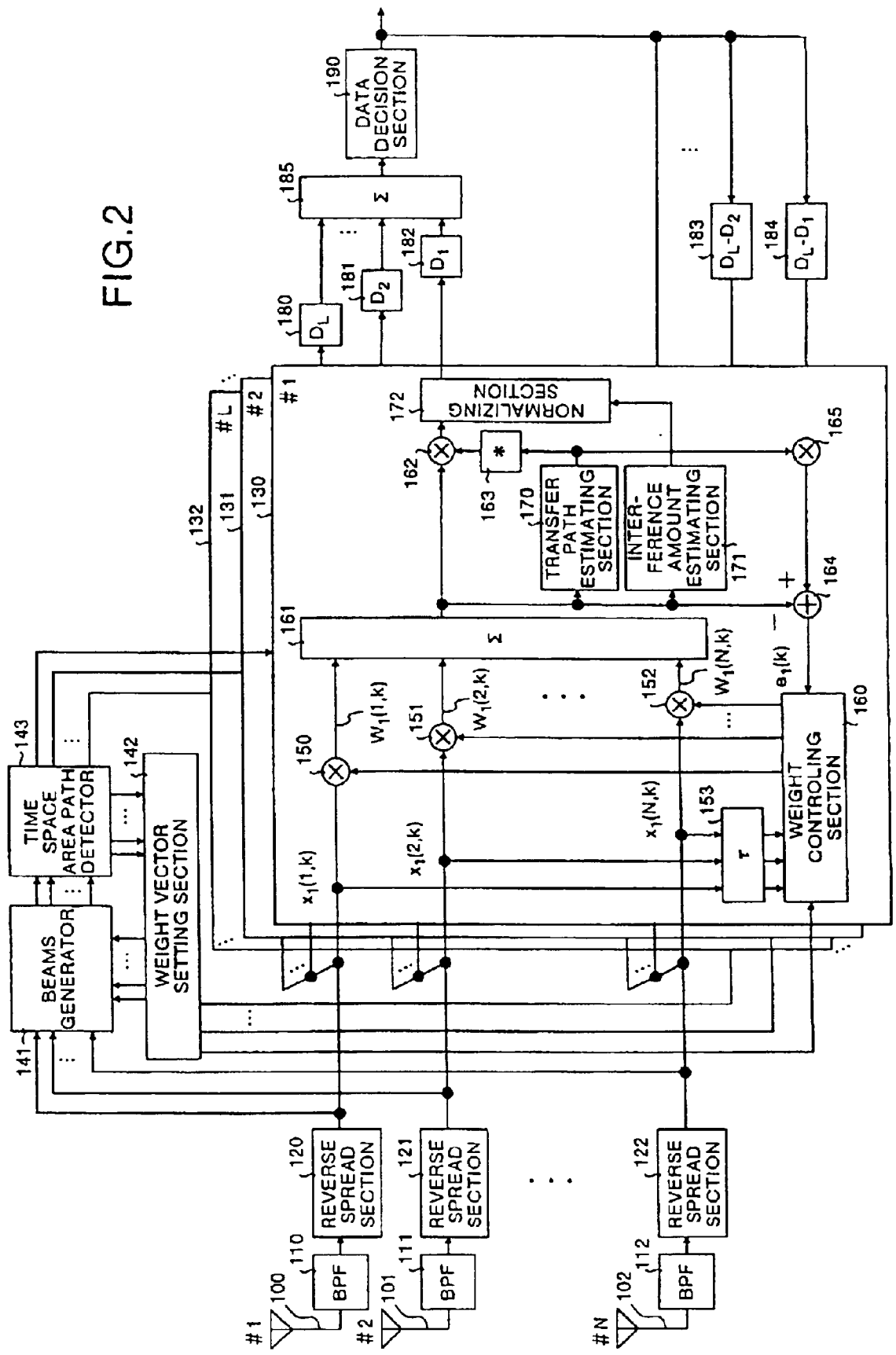
FIG. 2 shows the construction of a spectrum spread receiver of a third embodiment of the present invention.

In the same manner as the first embodiment, the third embodiment will discuss a spectrum spread receiver in which adaptive array antennas are used. FIG. 2 shows the construction of the second embodiment of a spectrum spread receiver in accordance with the present invention. Here, those parts that are the same as those shown in the first or second embodiment are indicated by the same reference numerals, and the description thereof is omitted.

In FIG. 2, reference numerals 130, 131, ..., 132 are beam forming sections for individually forming beams based upon L-number (natural number) of paths generated by signals that have been subjected to the reverse spreading process under an influence of multi-path waves, reference numeral 141 is a beams generator, 142 is a weight vector setting section, and 143 is a time space area path detector.

Figure 3:
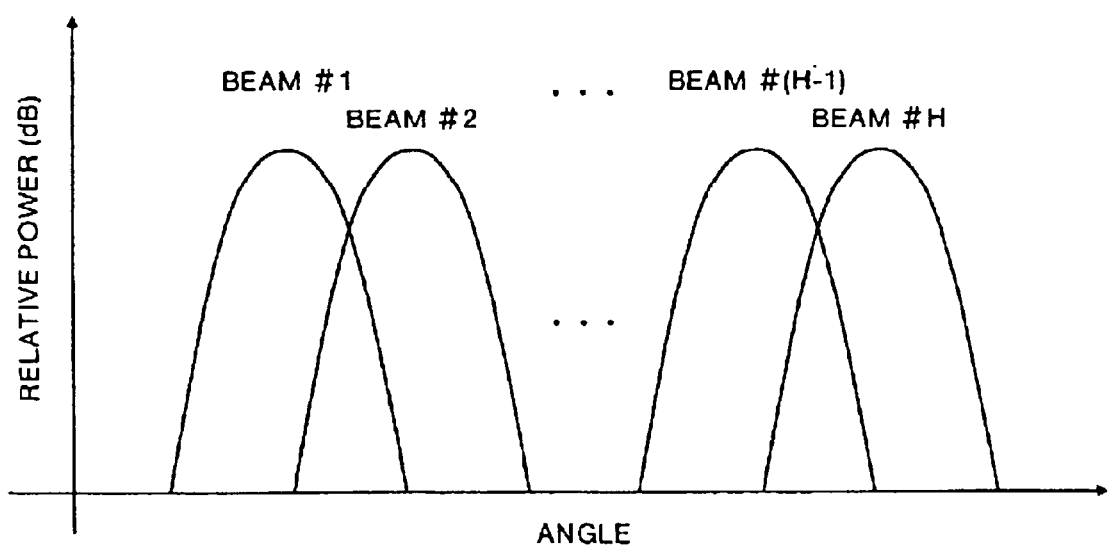
FIG. 3 shows a state in which a service area is covered by a plurality of beams.

Next, an explanation will be given of the operation of the spectrum spread receiver having the above-mentioned arrangement. With respect to the operations that are the same as the first embodiment, the description thereof is omitted. For example, the beams generator 141 covers the service areas by using the plurality of beams based upon the reverse spread signals received from the respective reverse spread sections. FIG. 3 shows a state in which the service areas are covered with the plurality of beams, and in this case, the covering is made by H-number (natural number) of beams.

Figure 4:
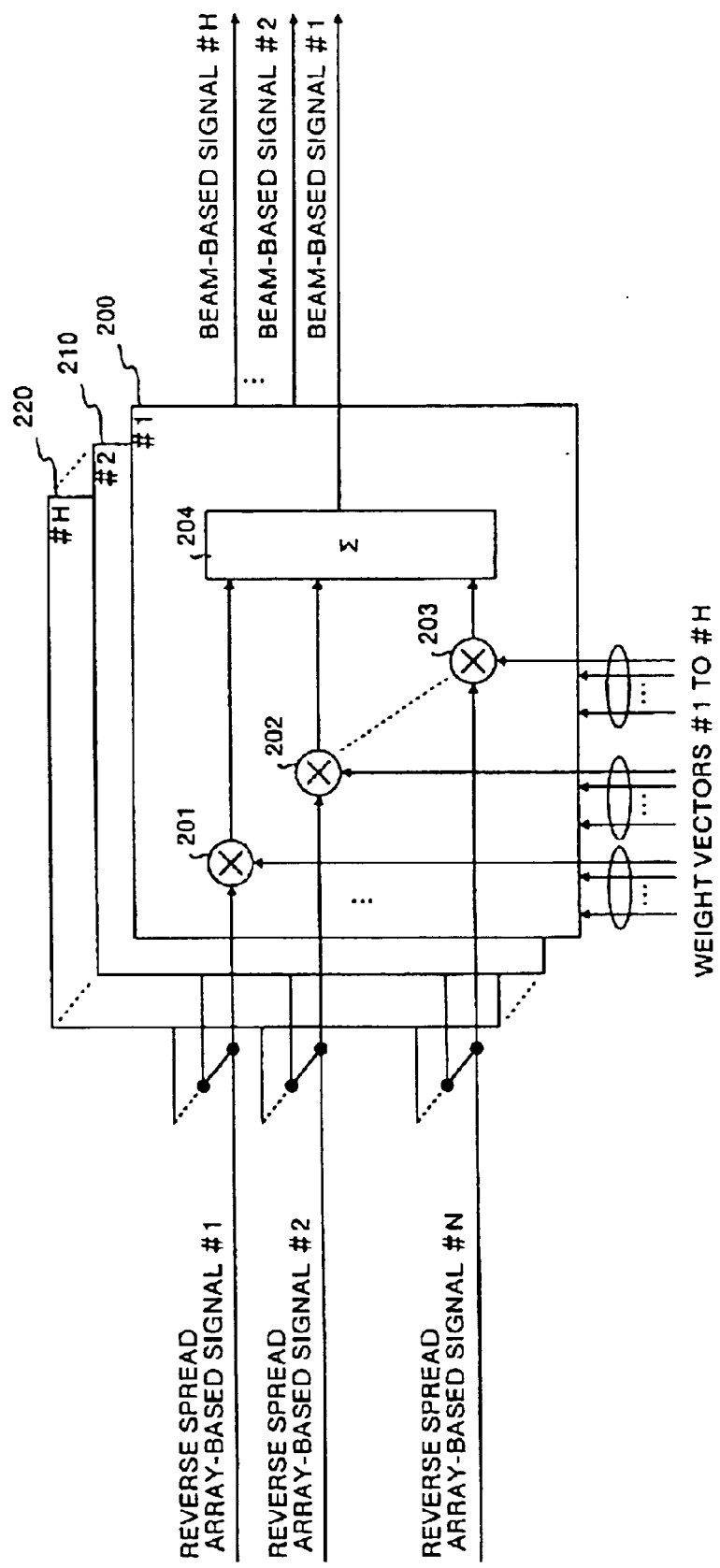
FIG. 4 shows the construction of a beams generator.

FIG. 4 shows the construction of the beams generator 141. In FIG. 4, reference numerals 200, 210, ..., 220 are beam forming sections, 201, 202, ..., 203 are complex multipliers, and 204 is an adder.

In this beams generator 141, in order to form a beam corresponding to the first path in the H-number of beams, the multipliers 201 to 203 multiply a weight for forming the first beam that is output from the weight vector setting section 142 on the respective reverse spread signals. Then, the adder 204 adds all the results of the multiplications, and outputs a beam corresponding to the first path to the time space area path detector 143. In the beams generator 141, in the same manner as described above, in order to form beams corresponding to the second to H-numbered path in the H-number of beams, weights for forming the second to H-numbered beams, output from the weight vector setting section 142, are multiplied on the respective reverse spread signals.

Figure 5:
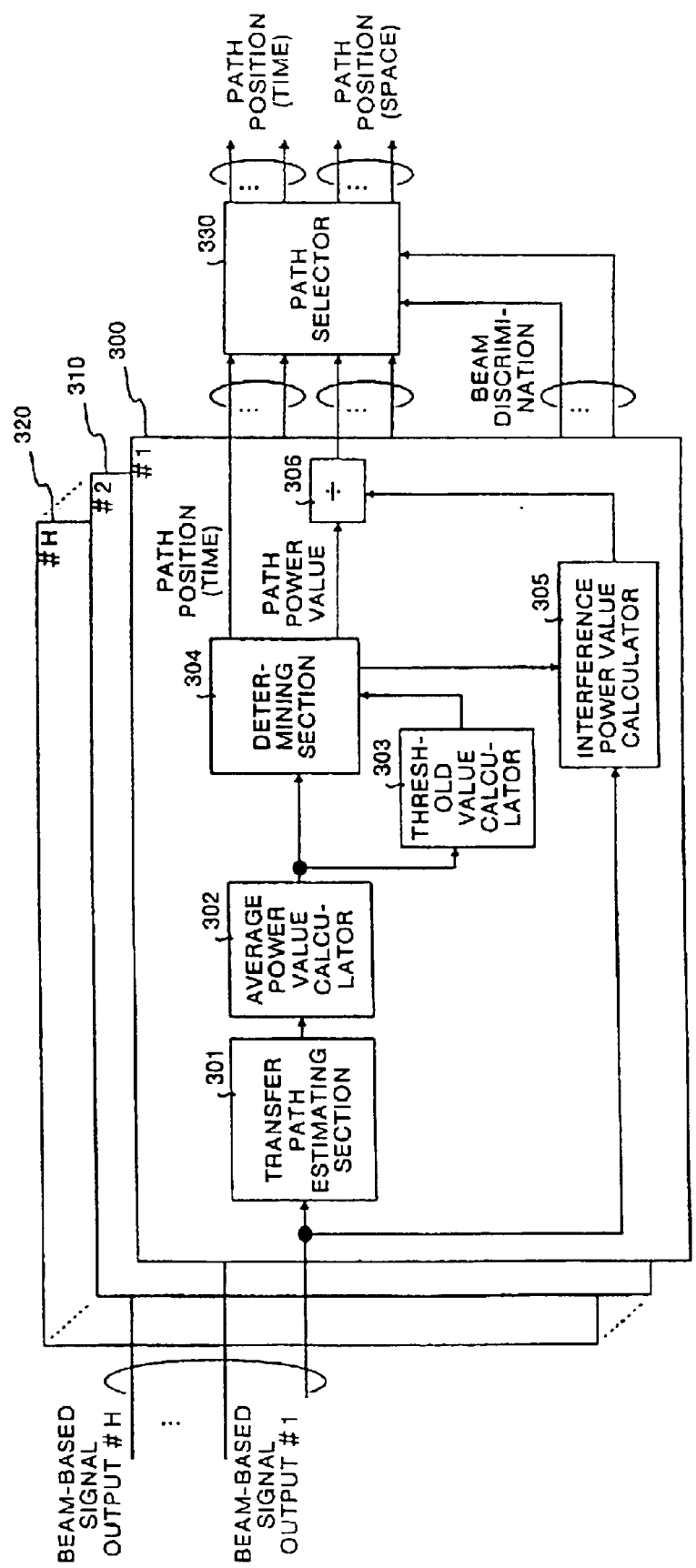
FIG. 5 shows the construction of a time-space area path detector.
Figure 6:
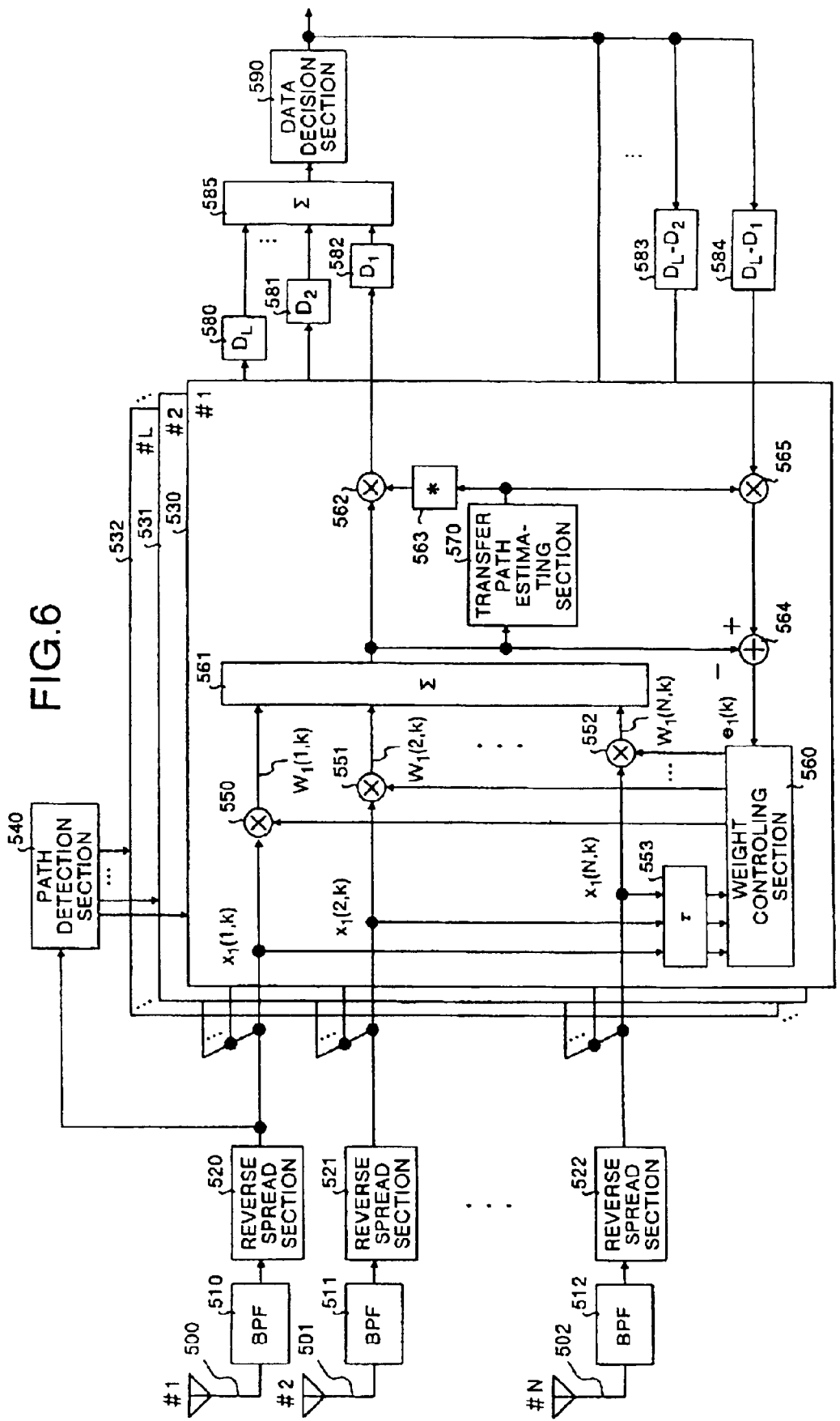
FIG. 6 shows the construction of a conventional spectrum spread receiver.

In the time space area path detector 143, based upon the H-number of beam signals thus received, a path detection is carried out on the basis of a beam. FIG. 5 shows the construction of the time space area path detector 143. In FIG. 5, reference numerals 300, 310, ..., 320 are beam-based path detectors for carrying out a path detection on the basis of a beam, 301 is a transfer path estimating section, 302 is an average power value calculator, 303 is a threshold value calculator, 304 is a determining section for determining the path, 305 is an interference power value calculator, 306 is a normalization section, and 330 is a path selector. An explanation will be given on the operation by exemplifying the beam-based detection section 300 corresponding to the first beam.

In the time space area path detector 143, first, the transfer path estimating section 301 estimates the transfer path based upon a beam-based signal #1 corresponding to the first beam. More specifically, the transfer path estimating section 301 adds all the symbols within one slot in the same phase by using pilot symbols that are provided on a slot basis to find an instantaneous transfer path estimation value.

Next, the average power value calculator 302 carries out an averaging operation of power over several slots by using the received transfer path estimating value, thereby calculating the average power delay profile as the result of the operation. Thereafter, in the threshold value calculator 303, among the received average power delay profiles, the path having the smallest power is regarded as noise or interference power, and the power value that is greater than the power by ΔdB is output as a threshold value used for the path selection.

The determining section 304 compares the average power delay profile and the threshold value, and the paths having average power values greater than the threshold value are set as the multi-paths corresponding to desired signals. Further, it outputs the time-sequential positional information of these paths and the power values of these paths. The time-wise positional information on the path is output to the path selector 330, and the power value information of the path is on the other hand output to the normalization section for normalizing the interference power, respectively.

On the other hand, the average power delay profile, the time-wise positional information and power value information of the path are input into the interference power value calculator 305, and the interference amount is estimated based upon the time-wise positional information and power value information of the path. More specifically, the interference power value calculator 305 adds all the average power profiles that have not been determined to have a path in a predetermined monitoring time range, and also averages this by the number of additions, thereby calculating the interference power of the beam.

In order to carry out a normalizing process based upon the beam interference power with respect to the power value of the path, the normalizing section 306 divides the power value of the path by the beam interference power, and outputs the result of the division as a normalized power value.

The path selector 330 first discriminates H-number of beam-based path detector output, based upon the beam discrimination information for discriminating which beam a piece of path information is derived from, that is, based upon the time-wise positional information of the path and the normalized power value. Then, since each beam forming section carries out a signal processing only on L paths preliminarily determined due to the limitations of H/W and S/W, the L paths are selected in the descending order from the greatest average power value. Moreover, the path selector 330 outputs the time-wise positional information of the selected path to each of the beam forming sections, and also outputs the time-wise positional information to the weight vector setting section 142. Here, the same processes are carried out on the second to the L-th paths.

Moreover, the weight vector setting section 142 sets the initial weight with respect to each of the beam forming sections on the basis of a path, based upon the result of the path detection by the time space area path detector 143. Here, with respect to the initial weight set for each beam forming section, it is designed that the weight at the time of the beam formation by the beams generator 141 is used so that the weight of the beam at the time when the path is detected by the time space area path detector 143 is set as the initial value of the beam on the basis of a path. Moreover, with respect to the second to L-th path, the same setting method is carried out.

In this manner, in the third embodiment, the same effects as the first and second embodiments are obtained, and in the initial state in which the adaptive array antennas are used for forming a beam, the service area is covered by using a plurality of beams having predetermined directivities and the path detection is carried out based upon the interference power so that the interference power within the beam is suppressed. Therefore, even in a transfer path with a great influence of interference, it is possible to carry out the path detection with high precision.

Moreover, in the third embodiment, in the initial state of the beam formation after the pass detection, among the plurality of beams having the predetermined directivities, the beam discriminating information for discriminating which beam the path information is derived from is utilized and the weight at the time of the beam formation by the beams generator 141 is set as the initial value of the weight for the adaptive antennas. This arrangement makes it possible to tell the arrival direction of the multi-paths. Therefore, in comparison with the conventional technique in which the weight is determined in a state where the arrival direction of the multi-paths is not known, it becomes possible to greatly shorten the time required for forming the beam based upon the adaptive algorithm.

In the third embodiment, the LMS is used for determining weights so as to determine beams. However, the adaptive algorithm is not intended to be limited by this, and for example, a known algorithm such as RLS may be used.

In this manner, in the third embodiment, even in the case when the interference wave power of beams formed on the basis of a path is not regarded as the same due to the fact that the positions of mobile stations are instantaneously biased or the fact that mobile stations having different transmission signal powers exist because of different transmission speeds, the signal after the weighting process/the phase variation removing process is combined after having been subjected to the weighting process in accordance with the interference amount, that is, after having been subjected to the normalization. Therefore, the SIR can be optimized, making it possible to obtain a superior bit error characteristic; consequently, it is possible to obtain a spectrum spread receiver that can achieve an optimal channel capacity.

In accordance with the next invention, since the weighting process is carried out in accordance with the interference amount, it is possible to optimize the SIR. Thus, it becomes possible to provide a spectrum spread receiver that can achieve a superior bit error rate characteristic.

In accordance with the next invention, moreover, in the initial state in which the adaptive array antennas are used for forming abeam, the service area is covered by using a plurality of beams having predetermined directivities and the path detection is carried out based upon the interference power so that the interference power within the beam is suppressed. Therefore, for example, it is possible to obtain a spectrum spread receiver which, even in a transfer path with a great influence of interference, can carry out the path detection with high precision.

In accordance with the next invention, in the initial state for forming the beam after the path detection, the beam discriminating information for discriminating which beam the path information is derived from the plurality of beams having the predetermined directivities is utilized so that the weight at the time of the beam formation by the plurality of beams generation step is set as the initial value of the weight of the adaptive antennas. Thus, it is possible to tell the arrival direction of the multi-paths, therefore, in comparison with the conventional technique in which the weight is determined in a state where the arrival direction of the multi-paths is not known, it becomes possible to greatly shorten the time required for forming the beam based upon the adaptive algorithm.

In accordance with the next invention, the characteristic is emphasized by carrying out the integral process using consequently to emphasize its characteristics. Therefore, even in the case when the mobile station that is a communication target is shifted, and when the shifting speed is high, it is possible to provide a spectrum spread receiver which can direct a beam to the mobile station with high precision.

INDUSTRIAL APPLICABILITY

As described above, the spectrum spread receiver in accordance with the present invention is suitable for carrying out communications by using a transfer path in which frequency selective fading is generated, and even in the case when the mobile station that is a communication target is shifted, and when the shifting speed is high, it is possible for the base station to direct a beam to the mobile station with high precision.

What is claimed is:

1. A spectrum spread receiver, which carries out a reverse spreading process on a signal received by a single antenna or a plurality of antennas, and also carries out a data demodulation process based upon the reverse spread signal, characterized by comprising:

a path detection unit which detects a plurality of multi-path waves from the reverse spread signal, which have satisfied a predetermined standard and for outputting time-sequential positional information of the paths;

a plurality of beam forming units which forms beams by using an adaptive algorithm based upon the time-sequential positional information that is received on the basis of the path;

a plurality of transfer path estimation units which calculate a transfer path estimation value based upon a receiving signal obtained on the basis of a beam, and carry out a weighting process in accordance with the signal amplitude and a removing process on the phase variation, based upon the results of the estimation;

an interference amount extraction unit which extracts an amount of interference based upon the received signal obtained on the basis of a beam;

a plurality of normalizing units which normalize the signals that have been subjected to the phase variation removing process based upon the amount of interference;

a combining unit which combines all the signals that have been normalized; and a determining unit which determines the signal after the combining by the combining unit.

2. The spectrum spread receiver according to claim 1, wherein the interference amount extraction unit calculates the amount of interference based upon a known sequence added to the transmission signal.

3. The spectrum spread receiver according to claim 1, wherein the path detection unit comprises:

a plurality of beam generating units which generate a plurality of beams required for covering areas that are service areas;

a path power normalizing unit which detects all the paths having power values not less than a predetermined threshold value on the basis of a beam, and for normalizing the power value that has been detected based upon an interference power calculated for each of the beams; and a path selection unit which selects a predetermined number of paths among the paths that have been detected in a descending order from the biggest power value.

4. The spectrum spread receiver according to claim 3, wherein, with respect to the initial value of the weight required for forming a beam using the adaptive algorithm, each of said beam forming unit uses the weight obtained at the time of beam formation by the plurality of beam generating units.

5. The spectrum spread receiver according to claim 1, wherein the adaptive algorithm is allowed to calculate an error signal by subtracting the received signal from a reference signal generated from the results of the determination, and also to generate a new error signal by carrying out an integral process by using a weighting coefficient on the error signal.

* * * * *